United States Patent [19]

Chatterjee

[11] Patent Number: 5,338,790
[45] Date of Patent: Aug. 16, 1994

[54] POLYMER COMPOSITIONS

[75] Inventor: Ananda M. Chatterjee, Katy, Tex.

[73] Assignee: Shell Oil Company, Houston, Tex.

[21] Appl. No.: 92,651

[22] Filed: Jul. 14, 1993

[51] Int. Cl.$^5$ .............................. C08K 5/09; C08K 5/01
[52] U.S. Cl. ................................ 524/400; 524/117;
524/487; 524/489
[58] Field of Search ............... 524/117, 436, 400, 487,
524/489; 526/348.6

[56] References Cited

U.S. PATENT DOCUMENTS

| | | | |
|---|---|---|---|
| 3,389,107 | 6/1968 | Hunter et al. | 524/489 |
| 4,029,682 | 6/1977 | Foulks | 524/400 |
| 4,094,839 | 6/1978 | Riegler et al. | 524/399 |
| 4,379,759 | 4/1983 | Goeke et al. | |
| 4,675,356 | 6/1987 | Miyata | 524/436 |
| 5,153,249 | 10/1992 | Yokote et al. | |
| 5,155,155 | 10/1992 | Jurlano | 524/489 |
| 5,155,160 | 10/1992 | Yeh et al. | 524/489 |
| 5,169,924 | 12/1992 | Asanuma et al. | |
| 5,196,496 | 3/1993 | Galimberti et al. | |
| 5,227,418 | 7/1993 | Mueller et al. | 524/400 |

FOREIGN PATENT DOCUMENTS

483523A1 of 1992 European Pat. Off. .

*Primary Examiner*—Veronica P. Hoke
*Attorney, Agent, or Firm*—Otto O. Meyers, III

[57] ABSTRACT

A polymer composition having a good balance of improved mechanical properties and optical properties such as low haze, which comprises
a) propylene-butene random copolymer,
b) at least one additive, and
c) a clarifying agent which is calcium montanate, at least one polyolefin wax or combinations thereof.

7 Claims, No Drawings

POLYMER COMPOSITIONS

FIELD OF THE INVENTION

This invention relates to certain polymer compositions having an excellent balance of mechanical properties, such as low hexane extractables content, low heat seal initiation temperatures, and optical properties, such as good clarity and haze. More particularly, the invention relates to a polymer composition comprising (1) a random copolymer of propylene and butene-1 and (2) at least one additive and (3) at least one clarifying agent which is calcium montanate or at least one polyolefin wax.

BACKGROUND OF THE INVENTION

Polyolefin polymers compositions have gained wide acceptance and usage in numerous commercial applications because of the relatively low cost of the polymers and the desirable properties they exhibit. Such commercial applications include plastic film, such as cast and biaxially oriented films, for food packaging, containers for food and medical devices such as syringes. It is very important for materials used as containers for foods and medical devices that the presence or absence of impurities or foreign substances such as refuse or the like in the contents of a container can be externally confirmed and it is not desirable that the color tint of the contents be changed when it is observed through the container. For this reason, it is desired to use a polymer composition of good transparency or clarity, in these fields.

There has widely been used a method for improving the clarity or transparency of polymer composition, in particular polypropylene resins, which comprises incorporating a sorbitol derivative into the resins. Yokote et al, U.S. Pat. No. 5,153,249 discloses a polypropylene resin composition which incorporates an additive package of 1-3, 2-4 di-benzylidene sorbitol and talc which are well-known nucleating additives.

Although the reference cited above teaches a copolymer composition exhibiting some improvement in optical properties, it would be of advantage to provide improved random copolymer compositions including a process for producing the improved copolymer compositions, having an improved balance of low haze (i.e., good transparency), low hexane extractables content, and low heat seal initiation temperature.

SUMMARY OF THE INVENTION

The present invention relates to a polymer compositions having an excellent balance of improved mechanical and optical properties.

More particularly, the present invention relates to a polymer composition of (1) a random copolymer comprising from about 0.8% to about 20% by weight of butene-1 and 80% to 99.2% by weight of propylene, (2) at least one additive and (3) at least one non-nucleating, clarifying agent which is calcium montanate or at least one polyolefin wax. The resulting polymer product has a haze, as measured according to ASTM D-1003, of up to 6%.

The invention also relates to a process for producing the random copolymer of the polymer composition and therefore the polymer composition, in the presence of a high activity stereoregular catalyst system obtained by contacting (i) an olefin polymerization procatalyst with (ii) an organoaluminum cocatalyst and (iii) a selectivity control agent.

DESCRIPTION OF THE INVENTION

The present invention comprises certain polymer compositions which, because of the particular composition thereof, exhibit an improved balance of mechanical properties and optical properties. These compositions are characterized as comprising (1) a propylene/butene-1 random copolymer resin, (2) at least one additive and (3) at least one haze-reducing, non-nucleating, clarifying agent which is calcium montanate, or at least one polyolefin wax. The resulting polymer composition has low hexane extractables content, low heat seal initiation temperature and excellent optical properties, such as low haze.

The polymer resin composition of the present invention are obtained by polymerizing propylene and butene-1 under polymerization conditions in the presence of a titanium-based, olefin polymerization catalyst system, such as a magnesium, titanium-containing polymerization catalyst system. Such polymerization catalyst systems are typically obtained by the combination of a titanium halide-based catalyst component, an organoaluminum compound and one or more electron donors. For convenience of reference, the solid titanium-containing catalyst component is referred to herein as "procatalyst" the organoaluminum compound, as "cocatalyst", and an electron donor compound, which is typically used separately or partially or totally complexed with the organoaluminum compound, as "selectivity control agent" (SCA).

Although a variety of chemical compounds are useful for the production of the procatalyst, a typical procatalyst of the invention is prepared by halogenating a magnesium compound of the formula $MgR'R''$, wherein $R'$ is an alkoxide or aryloxide group and $R''$ is an alkoxide, hydrocarbyl carbonate, aryloxide group or halogen, with a halogenated tetravalent titanium compound in the presence of a halohydrocarbon and an electron donor.

The magnesium compound employed in the preparation of the solid catalyst component contains alkoxide, aryloxide, hydrocarbyl carbonate or halogen. The alkoxide, when present, contain from 1 to 10 carbon atoms. Alkoxide containing from 1 to 8 carbon atoms is preferable, with alkoxides of 2 to 4 carbon atoms being more preferable. The aryloxide, when present, contains from 6 to 10 carbon atoms, with 6 to 8 carbon atoms being preferred. The hydrocarbyl carbonate, when present, contains 1 to 10 carbon atoms. When halogen is present, it is preferably present as bromine, fluorine, iodine or chlorine, with chlorine being more preferred.

Suitable magnesium compounds are magnesium chloride, ethoxy magnesium bromide, isobutoxy magnesium chloride, phenoxy magnesium iodide, magnesium fluoride, cumyloxy magnesium bromide, magnesium diethoxide, magnesium isopropoxide, magnesium stearate, magnesium ethyl carbonate and naphthoxy magnesium chloride. The preferred magnesium compound is magnesium diethoxide.

Halogenation of the magnesium compound with the halogenated tetravalent titanium compound is effected by using an excess of the titanium compound. At least 2 moles of the titanium compound should ordinarily be used per mole of the magnesium compound. Preferably from 4 moles to 100 moles of the titanium compound are used per mole of the magnesium compound, and most preferably from 8 moles to 20 moles of the titanium compound are used per mole of the magnesium compound.

Halogenation of the magnesium compound with the halogenated tetravalent titanium compound can be effected by contacting the compounds at an elevated temperature in the range from about 60° C. to about 150° C., preferably from about 70° C. to about 120° C. Usually the reaction is allowed to proceed over a period of 0.1 to 6 hours, preferably from about 0.5 to about 3.5 hours. The halogenated product is a solid material which can be isolated from the liquid reaction medium by filtration, decantation or a suitable method.

The halogenated tetravalent titanium compound employed to halogenate the magnesium compound contains at least two halogen atoms, and preferably contains four halogen atoms. The halogen atoms are chlorine atoms, bromine atoms, iodine atoms or fluorine atoms. The halogenated tetravalent titanium compounds has up to two alkoxy or aryloxy groups. Examples of suitably halogenated tetravalent titanium compounds include alkoxy titanium halides, diethoxytitanium dibromide, isopropoxytitanium triiodide, dihexoxytitanium dichloride, and phenoxytitanium trichloride, titanium tetrahalides such as titanium tetrachloride and titanium tetrabromide. The preferred halogenated tetravalent titanium compound is titanium tetrachloride.

Suitable halohydrocarbons include aromatic or aliphatic, including cyclic and alicyclic compounds. Preferably the halohydrocarbon contains 1 or 2 halogen atoms, although more may be present if desired. It is preferred that the halogen is, independently, chlorine, bromine or fluorine. Exemplary of suitable aromatic halohydrocarbons are chlorobenzene, bromobenzene, dichlorobenzene, dichlorodibromobenzene, chlorotoluene, dichlorotoluene, chloronaphthalene. Chlorobenzene, chlorotoluene and dichlorobenzene are the preferred halohydrocarbons, with chlorobenzene and chlorotoluene being more preferred.

The aliphatic halohydrocarbons which can be employed are suitable of 1 to 12 carbon atoms; preferably such halohydrocarbons have 1 to 9 carbon atoms and at least 2 halogen atoms. Most preferably the halogen is present as chlorine. Suitable aliphatic halohydrocarbons include dibromomethane, trichloromethane, 1,2-dichloroethane, trichloroethane, dichlorofluoroethane, hexachloroethane, trichloropropane, chlorobutane, dichlorobutane, chloropentane, trichloro-fluorooctane, tetrachloroisooctane, dibromodifluorodecane. The preferred aliphatic halohydrocarbons are carbon tetrachloride and trichloroethane.

Aromatic halohydrocarbons are preferred, particularly those of 6 to 12 carbon atoms, and especially those of 6 to 10 carbon atoms.

Suitable inert hydrocarbon diluents include aromatic hydrocarbons such as toluene, o-xylene, m-xylene, p-xylene, benzene, ethylbenzene, propylbenzene such as isopropylbenzene or cumene, trimethylbenzene and the like which are liquid at normal temperature.

The electron donors which are suitably included within the procatalyst are the generally conventional electron donors employed in titanium-based olefin polymerization procatalysts including ethers, esters, ketones, amines, imines, nitriles, phosphines, stibines, arsines and alcoholates. The preferred electron donors are esters and particularly aliphatic esters of aromatic monocarboxylic or dicarboxylic acids. Examples of such preferred electron donors are methyl benzoate, ethyl benzoate, ethyl p-ethoxybenzoate, ethyl p-methylbenzoate, diethyl phthalate, dibutylphthalate, diisobutyl phthalate, diisopropyl terephthalate and dimethyl naphthalenedicarboxyate. The electron donor is a single compound or a mixture of two or more compounds but preferably the electron donor is provided as a single compound. Of the preferred ester electron donors, ethyl benzoate and diisobutyl phthalate are particularly preferred. Sufficient electron donor is provided so that the molar ratio of electron donor to magnesium in the procatalyst is from about 0.002 to about 0.3. It is preferred that the molar ratio of electron donor to magnesium in the procatalyst is from about 0.03 to about 0.2, with a ratio from about 0.03 to 0.16 being more preferred.

After the solid halogenated product has been separated from the liquid reaction medium, it is treated one or more times with additional halogenated tetravalent titanium compound. Preferably, the halogenated product is treated multiple times with separate portions of the halogenated tetravalent titanium compound. Better results are obtained if the halogenated product is treated twice with separate portions of the halogenated tetravalent titanium compound. As in the initial halogenation, at least 2 moles of the titanium compound should ordinarily be employed per mole of the magnesium compound, and preferably from 4 moles to 100 moles of the titanium compound are employed per mole of the magnesium compound, most preferably from 4 moles to 20 moles of the titanium compound per mole of the magnesium compound.

The reaction conditions employed to treat the solid halogenated product with the titanium compound are the same as those employed during the initial halogenation of the magnesium compound.

Optionally, the solid halogenated product is treated at least once with one or more acid chlorides after washing the solid halogenated product at least once with additional amounts of the halogenated tetravalent titanium compound. Suitable acid chlorides include benzoyl chloride and phthaloyl chloride. The preferred acid chloride is phthaloyl chloride.

After the solid halogenated product has been treated one or more times with additional halogenated tetravalent titanium compound, it is separated from the liquid reaction medium, washed at least once with an inert hydrocarbon of up to carbon atoms to remove unreacted titanium compounds, and dried. Exemplary of the inert hydrocarbons that are suitable for the washing are isopentane, isooctane, hexane, heptane and cyclohexane.

The final washed product has a titanium content of from 1.5 percent by weight to 6.0 percent by weight, preferably from 2.0 percent by weight to 4.0 percent by weight. The atomic ratio of titanium to magnesium in the final product is between 0.01:1 and 0.2:1, preferably between 0.02:1 and 0.1:1.

The cocatalyst is an organoaluminum compound which is selected from the aluminum-based cocatalysts conventionally employed with titanium-based procatalysts. Illustrative organoaluminum compounds are trialkylaluminum compounds, alkylaluminum alkoxide compounds and alkylaluminum halide compounds wherein each alkyl independently has from 2 to 6 carbon atoms inclusive. The preferred organoaluminum compounds are halide free and particularly preferred are the trialkylaluminum compounds such as triethylaluminum, triisobutyl-aluminum, triisopropylaluminum and diethylhexylaluminum. Triethylaluminum is the preferred member of the class of trialkylaluminum compounds. The cocatalyst is employed in a sufficient quantity to provide a ratio of aluminum atoms to titanium atoms in the procatalyst from about 1:1 to about 300:1 but preferably from about 10:1 to about 100:1.

The organoaluminum cocatalyst is employed in sufficient quantity to provide from 1 mole to about 150 moles of aluminum per mole of titanium in the procatalyst. It is preferred that the cocatalyst is present in sufficient quantities to provide from 10 moles to about 100 moles of aluminum per mole of titanium in the procatalyst.

The selectivity control agents which are employed in the production of the olefin polymerization catalyst are those conventionally employed in conjunction with titanium-based procatalysts and organoaluminum cocatalysts. Suitable selectivity control agents include those electron donors as listed above for use in procatalyst production but also include organosilane compounds such as alkylalkoxysilanes and arylalkoxysilanes of the formula

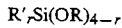
$$R'_r Si(OR)_{4-r}$$

wherein R' is alkyl or aryl of up to 32 carbon atoms inclusive, R is lower alkyl of up to 4 carbon atoms and r is 0 to 3.

Illustrative of the suitable selectivity control agents are esters such as ethyl p-ethoxybenzoate, diisobutyl phthalate, ethyl benzoate and ethyl p-methylbenzoate, and organosilanes such as diisobutyldimethoxysilane, n-propyl-trimethoxysilane, isopropyltrimethoxysilane, ethyltriethoxysilane, octadecyltriethoxysilane, octadecyltrimethoxysilane, and cyclohexylmethyldimethoxysilane. The selectivity control agent is provided in a quantity sufficient to provide from about 0.01 mole to about 100 moles per mole of titanium in the procatalyst. It is preferred that the selectivity control agent is provided in a quantity sufficient to provide from about 0.5 mole to about 70 moles per mole of titanium in the procatalyst, with about 8 moles to about 50 moles being more preferred.

The manner by which the solid procatalyst precursor, tetravalent titanium halide, the optional inert diluent and the electron donor are contacted is material but not critical and is generally conventional. In one embodiment the procatalyst precursor and the tetravalent titanium halide are mixed and the electron donor is subsequently added to the resulting mixture. In another embodiment, the electron donor and procatalyst precursor are mixed with the tetravalent titanium halide or a mixture of tetravalent titanium halide and optional inert diluent and the resulting solid is contacted one or more additional times with tetravalent titanium halide or the mixture of tetravalent titanium halide and optional inert diluent. The initial contacting of electron donor, procatalyst precursor and tetravalent titanium halide or the tetravalent titanium halide/optional inert diluent mixture is suitably conducted at a temperature from about ambient to about 150° C. Better interaction of these materials is obtained if they are heated and initial contacting temperatures from about 70° C. to about 130° C. are preferred, with temperatures from about 75° C. to about 110° C. being more preferred.

During each contacting with tetravalent titanium halide a portion of the inert diluent is optionally present and the reaction is facilitated on some occasions by the additional presence of an acid halide such as benzoyl chloride or phthaloyl chloride. The solid procatalyst is typically finished by a final wash with an inert hydrocarbon of up to 10 carbon atoms and drying under nitrogen. Exemplary of the inert hydrocarbons that are suitable for the washing are isopentane, isooctane, hexane, heptane and cylohexane.

The components of the olefin polymerization catalyst are usefully contacted by mixing in a suitable reactor outside the system in which α-olefin is to be polymerized and the catalyst thereby produced is subsequently introduced into the polymerization reactor. Alternatively, however, the catalyst components are introduced separately into the polymerization reactor or, if desired, two or all of the components are partially or completely mixed with each other (e.g. premixing selectivity control agent and the procatalyst) before they are introduced into the polymerization reactor.

The particular type of polymerization process utilized is not critical to the operation of the present invention and the polymerization processes now regarded as conventional are suitable in the process of the invention. The polymerization is conducted under polymerization conditions as a liquid phase or as a gas-phase process employing a fluidized catalyst bed.

The polymerization conducted in the liquid phase employs as reaction diluent an added inert liquid diluent or alternatively a liquid diluent which comprises the olefins, i.e., propylene and butene-1, undergoing polymerization. Typical polymerization conditions include a reaction temperature from about 25° C. to about 125° C., with temperatures from about 35° C. to about 100° C. being preferred, and temperatures from about 75° C. to 90° C. being most preferred, and a pressure sufficient to maintain the reaction mixture in a liquid phase. Such pressures are from about 150 psi to about 1200 psi, with pressures from about 250 psi to about 900 psi being preferred. The liquid phase reaction is operated in a batchwise manner or as a continuous or semi-continuous process. Subsequent to reaction, the polymer product is recovered by conventional procedures. The precise control of the polymerization conditions and reaction parameters of the liquid phase process are within the skill of the art.

As an alternate embodiment of the invention, the polymerization may be conducted in a gas phase process in the presence of a fluidized catalyst bed. One such gas phase process polymerization process is described in Goeke et al, U.S. Pat. No. 4,379,759, incorporated herein by reference, involves a fluidized bed, gas phase reaction. A gas phase process typically involves charging to reactor an amount of preformed polymer particles, and lesser amounts of catalyst component. The olefins, i.e., propylene and butene-1, to be polymerized, are passed through the particle bed at a rate sufficient to initiate polymerization. The butene-1 molar content present in the gas mixture being continuously fed is from 3% to 25%, 5% to 20% being preferred and 7% to 20% being more preferred. The molar ratio of butene-1 to propylene in the gas mixture is from 0.03 to 0.33, a ratio from 0.05 to 0.25 being preferred and a molar ratio from 0.08 to 0.15 being more preferred.

Upon passing through the particle bed, the unreacted gas is withdrawn from the reactor and recycled together with make-up feed gas. As the catalyst is lost through incorporation of minute amounts of catalyst within the polymer product, additional catalyst is provided to the reactor, often through the use of an inert transport gas such as nitrogen or argon. Polymerized olefin particles are collected at a rate substantially equivalent to its production. The reaction temperature is selected to be below the sintering temperature of the polymer particles and is controlled by an external heat exchanger in a gas cycle loop. Reaction temperatures from about 30° C. to about 90° C. may be used, with reaction temperatures from about 50° C. to about 80° C. being commonly used, reaction temperatures from 55° C. to 75° C. being more commonly used and temperatures from 55° C. to 70° C. being also used. The reaction pressure is generally from about 100 psi to about 600 psi although reaction pressures from about 150 psi to about 500 psi are preferred. The precise control of reaction conditions as well as the addition of catalyst and feed gas and the recycle of unreacted monomer is within the skill of the art.

In both the liquid phase and the gas-phase polymerization processes, molecular hydrogen is added to the reaction mixture as a chain transfer agent to regulate the molecular weight of the polymeric product. Hydrogen is typically employed for this purpose in a manner well known to persons skilled in the art. The precise control of reaction conditions, and the rate of addition of feed component and molecular hydrogen is broadly within the skill of the art.

The desired polymeric products are obtained as particulate matter formed by growth of polymer product on the polymer particles provided to the fluidized bed or as particles formed in the reactor. The polymer particles are removed from the reactor at a rate which is substantially equivalent to the rate of polymer production and the particles are passed to a subsequent reaction zone or are finished by conventional methods prior to use.

The polymers produced according to this invention are random copolymers which are predominantly isotactic in structure. The random copolymers of the invention comprise from about 0.8% to about 20% by weight of butene-1. It is preferred that the random copolymer comprise 5% to 18% by weight of butene-1, with 7% to 14.5% by weight of butene-1 being more preferred.

According to the present invention, in addition to the random copolymer resin, the polymer composition of the invention further comprises at least one additive and at least one clarifying agent such as calcium montanate or at least one polyolefin wax. Calcium montanate is used in an amount ranging from 0.02% to 1.2% by weight of polymer resin composition, preferably 0.05% to 1.0% by weight, 0.1 to 0.5% being more preferred, with 0.15 to 0.3% being most preferred.

The viscosity of the polyolefin wax used in the present invention is from 500 millipascal (m-Pa)-seconds to 2500 m-Pa-seconds (at 170° C.), and from 100 m-Pa-seconds to 2000 m-Pa-seconds being preferred. The polyolefin wax has an average particle size which is no more than 2000 μm. The amount of polyolefin wax added to the composition ranges from 0.02% to 1.2% by weight of polymer resin composition, preferably 0.05% to 1.0% by weight, with 0.1% to 0.5% being more preferred.

The polyolefin waxes used in the invention contain 2 to 3 carbon atoms. Suitable polyolefin waxes include polyethylene waxes such as POLYWAX® 300 polyethylene wax which is available from Petrolite Corporation, and polypropylene waxes, such as Polypropylene wax 230, which is available from Hoechst Celanese and combinations thereof. The preferred polyolefin wax is polypropylene wax.

The at least one additive is selected from a group of suitable additives which includes process stabilizers, antioxidants, ultraviolet absorbers, acid neutralizing agents, such as magnesium aluminum hydroxycarbonate hydrate, and dispersants, which are conventionally employed in commercial polymers compositions and do not adversely affect the haze or transparency of the compositions.

Examples of antioxidants which can be used in the invention are bis(2,4-di-tert-butylphenyl)pentaerythritol diphosphite, tris(2,4-di-butylphenyl)phosphite, 2,6-di-t-butyl-p-methylphenol, n-octadecyl-3-(4-hydroxy-3,5-di-tert-butylphenyl)-propionate, tetrakis[methylene(3,5-di-t-butyl-4-hydroxyhydrocinnamate)]methane, pentaerythritol-tetrakis-($\beta$-laurylthiopropionate) and distearyl thiodipropionate.

Typical examples of ultraviolet absorbers include 2-hydroxy-4-n-octoxy-benzophenone, 2-(2'-hydroxy-3',5'-di-tert-butyl-phenyl)-5-chlorobenzo-triazole, dimethyl succinate-2-(4-hydroxy-2,2,6,6-tetramethyl-1-piperidyl)ethanol condensate.

The polymer compositions of this invention have one or more of the following characteristics (A) to (G).

(A) An elongation at break, as measured according to ASTM D882, in the range of 600% to 2000%, preferably a range of 600% to 1500%, with a range from 700% to 1400% being more preferred.

(B) A low heat seal initiation temperature, in the range from 90° C. to 150° C., preferably a range from 100° C. to 145° C., with a range from 105° C. to 140° C. being more preferred. Heat seal initiation temperature is determined by sealing a 1 mil film sample at 14.7 psi for about one second at a given temperature using a Sentinel Model 12-12A heat sealer with a ⅛ inch wide heater bar. The sealing temperature is increased at 5° C. degree intervals until the seal does not separate when a force of approximately 50 gm/in is applied to the seal. The heat seal initiation temperature is the minimum temperature at which the film seal does not break under the 50 g/in load.

(C) A hexane extractable content at 50° C., as measured according to 21 C.F.R. §177.1520(c)(3.1 & 3.2), of up to 5.5%, preferably up to 3.5%, up to 2.6% being more preferred, and up to 2.0% being most preferred.

(D) A xylene solubles content at 23° C., as measured according to 21 C.F.R. 177.1520, of up to 13%, preferably up to 6%, with up to 5% being more preferred, and up to 3% being most preferred.

(E) A modulus, as measured according to ASTM D882 (1% secant at 0.05 inches/min), of at least 60,000 psi, preferably of at least 80,000 psi, with at least 100,000 psi being more preferred, (F) A melting point from 120° C. to 155° C., and (G) A haze, as measured by ASTM D-1003, of up to 6%, with a haze of up to 3% being preferred, a haze of up to 2% being more preferred, and a haze of up to 1.8% being most preferred. Haze is a measure of transparency of the composition of the invention. Haze increases with increasing thickness of film.

The polymer compositions as described above when produced by typical gas phase processes will have melt flows, as determined by a conventional test procedure such as ASTM-D1238, Cond. L, of from about 0.8 dg/min to about 50 dg/min. A melt flow of from about 1 dg/min to about 25 dg/min being preferred and from about 3 dg/min to about 20 dg/min being more preferred.

As an alternative embodiment of the invention, the polymer compositions are contacted at elevated temperatures, e.g., above 180° C., with peroxide. The treatment is termed "visbreaking" and the procedures thereof are within the skill of the art.

The visbroken polymer products of this invention are obtained by visbreaking the polymer compositions of the present invention that have a melt flow of at least 0.8 dg/min. The melt flow ratio of the resulting visbroken product to the starting non-visbroken polymer product is at least 2, a melt flow ratio of 5 is preferred, with a melt flow ratio of 8 being more preferred.

The polymer compositions of the invention as well as the visbroken derivatives thereof are characterized by an excellent balance of improved low heat seal initiation temperatures, low hexane extractables, and good clarity and low haze.

The compositions of the invention are processed by conventional procedures used for thermoplastic materials such as extrusion, injection molding, thermoforming and related processes. Among particular applications for the compositions are the production of oriented or unoriented films by casting or film blowing methods. After fabrication, the film can be heat sealed by sealing jaws at a preset temperature, pressure and dwell time. The resulting film has lower heat seal initiation temperatures, low hexane, extractables and improved optical properties such as low haze, i.e., good transparency.

Other features, advantages and embodiments of the invention disclosed herein will be readily apparent to those exercising ordinary skill after reading the foregoing disclosure. In this regard, while specific embodiments of the invention have been described in detail, variations and modifications of these embodiments can be effected without departing from the spirit and scope of the invention as described and claimed.

ILLUSTRATIVE EMBODIMENT I

A. Preparation of Procatalyst

To a solution of 70 milliliters of titanium tetrachloride (120 grams, 0.64 mol) in 3.7 liters of chlorobenzene are added, in succession, 180 milliliters of diisobutyl phthalate (187 grams, 0.67 mol), 590 grams (5.2 mols) of magnesium diethoxide, and a solution of 4.7 liters of titanium tetrachloride (8100 grams, 43 mols) in 1.2 liters of chlorobenzene. A temperature of 20° C. to 25° C. is maintained during these additions. The resulting mixture is then heated to 110° C. with stirring, the temperature being maintained for 1 hour. At the end of this time, the mixture is filtered while hot. A solid material is collected.

The solid material is then slurried in a solution of 4.7 liters of titanium tetrachloride (8100 grams, 43 mols) in 1.2 liters of chlorobenzene at room temperature. A solution of 45 grams (0.22 mol) of phthaloyl dichloride in 3.7 liters of chlorobenzene is added to the slurry at room temperature and the resulting slurry is then heated to 110° C. with stirring, the temperature being maintained for 30 minutes. At the end of this time, the mixture is filtered while hot. A solid material is collected.

The solid material is reslurried in a solution of 4.7 liters of titanium tetrachloride (8100 grams, 43 mols) in 1.2 liters of chlorobenzene at room temperature. An additional 3.7 liters of chlorobenzene is then added to the slurry at room temperature, and the resulting slurry is heated to 110° C. with stirring, the temperature being maintained in 30 minutes. At the end of this time, the mixture is filtered while hot. A solid material is collected.

The solid material is reslurried once again in a solution of 4.7 liters of titanium tetrachloride (8100 grams, 43 mols) in 1.2 liters of chlorobenzene at room temperature. An additional 3.2 liters of chlorobenzene is then added to the slurry at room temperature, and the resulting slurry is heated to 110° C. with stirring, the temperature being maintained for 30 minutes. At the end of this time, the mixture is filtered while hot. The residue is washed 6 times with 500 milliliter portions of hexane at 25° C. and then dried under a nitrogen purge. The product weighs about 500 grams.

B. Polymerization

The procatalyst of section A was continuously fed into a fluidized bed reactor as a 30% by weight dispersion in mineral oil. Simultaneously and continuously, triethylaluminum, as a 5% by weight solution in isopentane and a selectivity control agent ("SCA" = N-propyltrimethoxysilane) as a 0.5 to 5 percent solution in isopentane, were introduced to the reactor. Sufficient hydrogen was introduced to regulate the molecular weight of the polymer product. A small amount of nitrogen is also present. The partial pressure of propylene was from about 330 psi to about 380 psi. The polymerization temperature was 65° C. and the residence time was 2 hours. The reactor product was recovered by conventional means.

ILLUSTRATIVE EMBODIMENT II

Film Casting of Polymer Product

Some of the polymer reactor products, produced according to Illustrative Embodiment I, were recovered by conventional means. The recovered reactor products (propylene/butene-1 random copolymer with about 7% by weight butene-1 and melt flow of 3.4, as measured by ASTM D-1238 Cond. L) were mixed and pelletized with a base additive package of Irganox ® 1010 (500 ppm), Ultranox ® 626 (800 ppm), Hydrotalcite DHT-4A (200 ppm) and one of the following candidate agents:

A) Hoechst ® PP wax 230 which is a polypropylene wax available from Hoechst Celanese.
B) Millad ® 3905 nucleating agent available from Milliken Chemicals,
C) Millad ® 3940 nucleating agent available from Milliken,
D) Millad ® 3988 nucleating agent which is an unsymmetrical sorbitol derivative available from Milliken,
E) Mark ® 2180 nucleating agent available from Witco Corporation,
F) Calcium montanate available from Hoechst Celanese, as Hostalub VP ® CAW2,
G) Polywax ® 3000 T6 which is a polyethylene wax available from Petrolite Corporation,
H) Vantalc ® 6H talc available from R. T. Vanderbilt Company,
I) GP638R graphite available from Union Carbide, or
J) NC-4 which is sodium bis(para-tert-butylphenyl) phosphate available from Mitsui Toatsu Chemicals.

The pellets were extruded into 5 mil thick cast film using a ¾ inch Brabender extruder (200° C. melt temperature) with 8 inch wide die and Killion chill roll (15°

C.). Operating conditions for all polymer blends were the same.

Crystallization temperature (Tc) was measured using a Perkin Elmer Series 7 Differential Scanning Calorimeter Thermal Analysis System. The polymer was melted at 220° C. and then cooled at 10° C./minute. The exothermic peak temperature was recorded as the Tc.

The test results for the films produced are provided in TABLES 1 AND 2.

TABLE 1

| AGENT | PPM Level[2] | | | | |
|---|---|---|---|---|---|
| | 0 | 1000 | 2000 | 3500 | 5000 |
| | % Haze | | | | |
| Millad ® 3905 | 8.7 | 3.7 | 3.8 | 4.8 | — |
| Millad ® 3940 | 8.7 | 2.4 | 2.3 | 2 | — |
| Mark ® 2180 | 8.7 | 7.7 | 8.2 | 10.3 | — |
| NC4 | 8.7 | 1.8 | 3 | 2.7 | — |
| Millad ® 3988 | 8.7 | 3.3 | 2.7 | 1.6 | — |
| Ca Montanate | 8.7 | 1.7 | 1.7 | — | 1.7 |
| PP wax[3] | 8.7 | 1.7 | 1.6 | — | 1.6 |
| Na Benzoate | 8.7 | 16.6 | 16.4 | 24.4 | — |
| PEWAX[4] | 8.7 | 5.8 | 8.9 | — | 5.3 |
| Vantalc 6H | 8.7 | 15.9 | 17.1 | — | 20.5 |
| Graphite (GP638R) | 8.7 | 15.0 | 21.4 | — | — |

[1]TABLE 1 presents % haze data as a function of the agent.
[2]Parts per million of agent used in polymer composition.
[3]Polypropylene wax
[4]Polyethylene wax As noted in Table 1, the presence of sodium benzoate, talc or graphite tends to increase the haze (i.e., lower the transparency) of propylene-butene random copolymer.

TABLE 2[1]

| AGENT | PPM LEVEL | | | | |
|---|---|---|---|---|---|
| | 0 | 1000 | 2000 | 3500 | 5000 |
| | Crystallization Temperature, °C. | | | | |
| Millad ® 3905 | 103.8 | 103.8 | 112.3 | 112.0 | — |
| Millad ® 3940 | 103.8 | 111.0 | 115.8 | 116.0 | — |
| Mark ® 2180 | 103.8 | 115.7 | 116.3 | 117.1 | — |
| NC-4 | 103.8 | 107.6 | 116.6 | 117.1 | — |
| Millad ® 3988 | 103.8 | 112.8 | 116.4 | 117.4 | — |
| Ca Montanate | 103.8 | 103.95 | 103.95 | — | 103.1 |
| PP Wax[2] | 103.8 | 106.0 | 104.5 | — | 103.8 |
| Na benzoate | 103.8 | 114.1 | 115.9 | 115.3 | — |
| PE WAX[3] | 103.8 | 102.3 | 103.3 | — | 103.3 |
| Vantalc ® 6H | 103.8 | 110.7 | 108.8 | — | 108.2 |
| Graphite (GP638R) | 103.8 | 107.1 | 108.4 | — | 109.8 |

[1]Crystallization temperature (Tc) of propylene-butene random copolymer as a function of parts per million (PPM) level of agent in composition.
[2]Polypropylene wax
[3]Polyethylene wax As presented in TABLE 2, calcium montanate, polypropylene wax and polyethylene wax generally did not nucleate the propylene-butene random copolymer.

What I claim is:

1. In a polymer composition consisting essentially of:
   (a) a random copolymer of about 0.8% to about 20% by weight of butene-1 and about 80% to about 99.2% by weight of propylene, and
   (b) at least one additive selected from antioxidants, ultraviolet absorbers, dispersants, acid neutralizing agents and process stabilizers, wherein the improvement comprises the incorporation of a clarifying agent selected from calcium montanate, at about 0.02% to about 1.2% by weight of the composition, and polypropylene wax, at from about 0.02% to about 1.2% by weight of the composition, or combinations thereof, wherein the total of the combination is from about 0.02% to about 1.2% by weight of the composition.

2. The polymer composition of claim 1 wherein the at least one additive is selected from the group of anti-oxidants, process stabilizers, ultraviolet absorbers, dispersants and acid neutralizing agents.

3. The polymer composition of claim 2 comprising 5% to 18% by weight of butene-1 and 82% to 95% by weight of propylene.

4. A polymer composition of claim 1 wherein the random copolymer is visbroken by contacting propylene and butene-1 under polymerization conditions with a magnesium, titanium containing catalyst system to produce a polymer material having a melt flow of at least 0.8 dg/min and then visbreaking said resulting polymeric material such that the melt flow ratio of visbroken random copolymer to the polymeric material is at least 2.0.

5. The polymer composition of claim 2 wherein the at least one additive (b) comprises tetrakis[methylene(3,5-di-tertbutyl-4-hydroxyhydrocinnamate)]methane, bis(2,4-di-tertbutylphenyl)pentaerythritol diphosphite and magnesium aluminum hydroxycarbonatehydrate.

6. A process for producing a polymer composition comprising:
   (a) contacting propylene and butene-1 under polymerization conditions with a magnesium, titanium-containing catalyst system comprising (i) a titanium, magnesium-containing procatalyst obtained by contacting a magnesium compound, a tetravalent titanium halide and an electron donor optionally in the presence of an inert diluent, (ii) an organoaluminum cocatalyst, and (iii) an organosilane selectivity control agent, to form a random copolymer wherein the resulting random copolymer comprises from about 0.8% to about 20% by weight of butene-1 and from about 80% to about 99.2% by weight of propylene, and
   (b) combining the resulting random copolymer with (iv) an additive package having at least one member selected from the group of antioxidants, ultraviolet absorbers, dispersants, acid neutralizing agents, and process stabilizers, and (v) a clarifying agent which is calcium montanate, propylene wax or combinations thereof, wherein the clarifying agent (v) is present in an amount from about 0.02% to about 1.2% by weight of the total polymer composition, wherein the polymer composition has:
   i. a heat seal initiation temperature in the range from 90° C. to 150° C.,
   ii. a hexane extractable content at 50° C. of up to 5.5%,
   iii. xylene solubles content at 23° C. of up to 13%,
   iv. a melting point in the range from 120° C. to 155° C., and
   v. a haze of up to 6%.

7. A process according to claim 6 wherein the magnesium compound is magnesium alkoxide having 2 to 4 carbon atoms; the tetravalent titanium halide is titanium tetrachloride; the electron donor is diisobutyl phthalate; the inert diluent is chlorobenzene, chlorotoluene, toluene, benzene, o-xylene, m-xylene, p-xylene, ethylbenzene, propylbenzene, tetrachloride, trichloride or mixtures thereof; the organoaluminum cocatalyst is triethylaluminum; and the organosilane selectivity control agent is alkylalkoxysilanes and arylalkoxysilanes of the formula $$R'Si(OR)_{4-r}$$

wherein R' is alkyl or aryl of up to 32 carbon atoms inclusive, R is lower alkyl of up to 4 carbon atoms and r is 0 to 3.

* * * * *